United States Patent
Humenberger

(10) Patent No.: US 11,285,655 B2
(45) Date of Patent: Mar. 29, 2022

(54) METHOD OF MANUFACTURING A PLASTIC TANK

(71) Applicant: MAGNA Energy Storage Systems GesmbH, Sinabelkirchen (AT)

(72) Inventor: Harald Humenberger, St. Ruprecht (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 17/060,286

(22) Filed: Oct. 1, 2020

(65) Prior Publication Data

US 2021/0402671 A1  Dec. 30, 2021

(30) Foreign Application Priority Data

Nov. 18, 2019 (EP) .................................. 19209700

(51) Int. Cl.

| B29C 49/24 | (2006.01) |
| B29C 49/04 | (2006.01) |
| B29C 49/20 | (2006.01) |
| B29C 49/62 | (2006.01) |
| B29K 105/06 | (2006.01) |
| B29L 31/00 | (2006.01) |

(52) U.S. Cl.
CPC .......... *B29C 49/2408* (2013.01); *B29C 49/04* (2013.01); *B29C 49/20* (2013.01); *B29C 49/62* (2013.01); *B29C 2049/2017* (2013.01); *B29C 2049/627* (2013.01); *B29K 2105/06* (2013.01); *B29L 2031/7172* (2013.01)

(58) Field of Classification Search
None
See application file for complete search history.

(56) References Cited

U.S. PATENT DOCUMENTS

2016/0052386 A1   2/2016   De Keyzer et al.

FOREIGN PATENT DOCUMENTS

| DE | 691 02 487 T2 | 10/1994 |
| JP | H03231827 A | 10/1991 |
| WO | 94/12334 A1 | 6/1994 |

*Primary Examiner* — Monica A Huson
(74) *Attorney, Agent, or Firm* — Jordan IP Law, LLC; Todd A. Vaughn

(57) ABSTRACT

A method for producing a plastic tank includes preparing a tank wall as a hot extrudate. A reinforcing sheet is then attached to at least one region of the outer layer of the hot extrudate. After introducing the attached reinforcing sheet and the hot extrudate into a shaping tool, the shaping tool performs shaping of the hot extrudate and the attached reinforcing sheet to form the tank wall, while simultaneously enhancing the attachment of the reinforcing sheet to the tank wall.

16 Claims, 3 Drawing Sheets

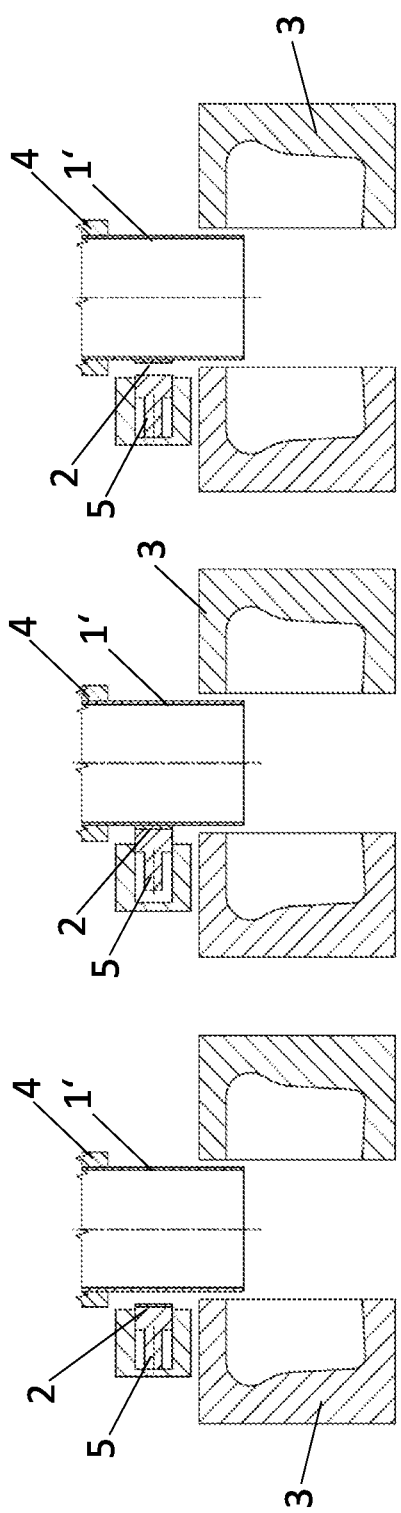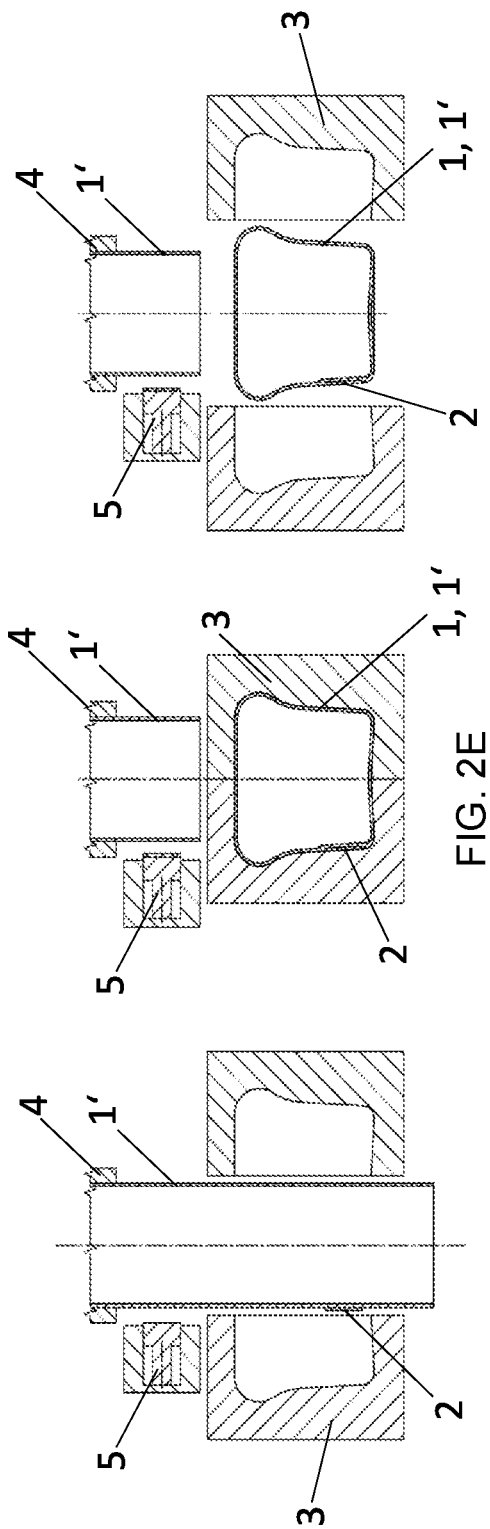

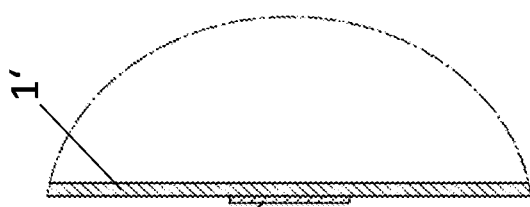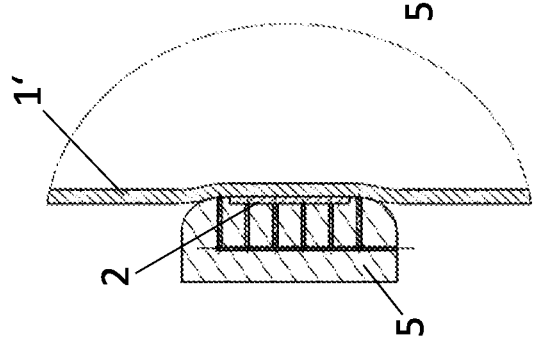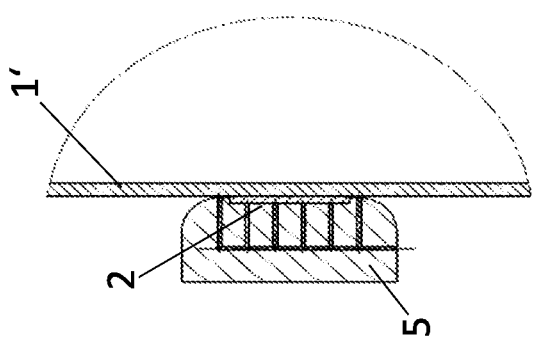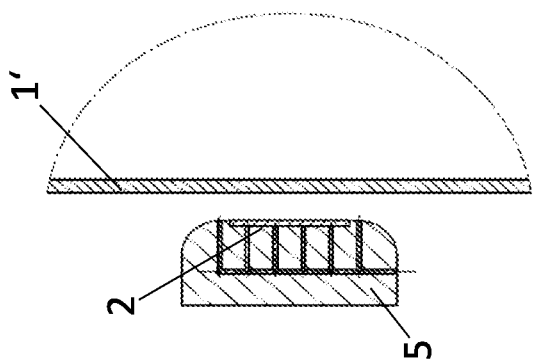

METHOD OF MANUFACTURING A PLASTIC TANK

CROSS-REFERENCE TO RELATED APPLICATIONS

The present application claims priority 35 U.S.C. § 119 to European Patent Publication No. EP 19209700.4 (filed on Nov. 18, 2019), which is hereby incorporated by reference in its entirety.

TECHNICAL FIELD

Embodiments relate to a method for producing a plastic tank.

BACKGROUND

It is known that plastic tanks, which in recent times have been installed, for example, as fuel tanks of motor vehicles, such as passenger cars and heavy goods vehicles, in addition to having a number of positive characteristics, are problematic in respect of possible deformations of the fuel tank. During the normal operation of tank systems in motor vehicles, large deformations can occur in certain zones of the tank system. Combinations of pressure and temperature peaks in zones of the tank can cause large relative movements of the tank shells, especially in the case of plastic tanks, and these must be limited by design measures.

Prior-art supporting concepts for reducing the unwanted deformations of the fuel tank usually use points of support fixed with respect to the body to limit deformations of the tank walls. Particularly for pressurized tank systems, however, these measures are not sufficient, and additional measures must be employed to reduce deformations. Often, the shell thickness of the tank bladder is increased, or reinforcing components are secured on the tank wall to limit deformation. However, the attachment of reinforcing components to a tank wall has hitherto been time-consuming and expensive and lacking in flexibility in respect of the feasible component geometries for reinforcement.

SUMMARY

Embodiments relate to a method for producing a plastic tank in a manner such that the plastic tank is protected from deformations. At the same time, it is possible to carry out the method in a particularly efficient manner, and is flexible in respect of reinforcement geometries.

In accordance with embodiments, a method for producing a plastic tank, wherein at least one outer layer of the tank wall of the plastic tank is composed of a first material, wherein a reinforcing sheet, which is composed at least partially of the first material, is attached to an outer layer of the tank wall of the plastic tank in at least one region, wherein first of all the tank wall is prepared as a hot extrudate, the reinforcing sheet is secured, in particular welded, on the extrudate outside a shaping tool, the extrudate is then introduced with the secured reinforcing sheet into the shaping tool, and is shaped in the shaping tool to form the tank wall of the plastic tank, whereby the reinforcing sheet is secured more strongly on the tank wall, in particular welded more strongly to the tank wall.

In accordance with embodiments, a reinforcing sheet is applied to a tank wall as a reinforcing element, wherein application takes place in two stages: first of all, the reinforcing sheet is secured only lightly or brought into contact with the extrudate outside a shaping tool. Since the reinforcing sheet is composed at least partially of the same material as the tank wall, in particular, of the same plastic, or comprises this same plastic, it is, in particular, a simple matter for the reinforcing sheet to be pressed onto the tank wall, with the result that the reinforcing sheet is melted or welded onto the hot tank wall or extrudate. The same tank wall, with the reinforcing sheet, also referred to as a "patch", attached, is then shaped to the final shape of the plastic tank in a shaping tool, wherein the reinforcing sheet is secured even more strongly on the tank wall or welded thereto or more strongly fused thereto owing to the conditions, in particular pressures, prevailing during this process.

Through the introduction according to the invention of the patch or reinforcing sheet outside the forming tool, the reproducible complexity of the surface geometry of the reinforcing sheet and the achievable degrees of forming are very high.

As used herein, the term "outer layer" refers to a tank wall layer situated on the outside and may be on the inside or the outside of the tank in the case of a fully formed plastic tank.

The tank wall is preferably of multi-layer or multi-ply construction, but may also consist of a single layer.

The reinforcing sheet is preferably composed of a fibre-reinforced plastic, wherein the fibre reinforcement is embedded into a matrix and wherein the matrix is composed of the first material. The first material is preferably high-density polyethylene (HDPE).

As a particular preference, the reinforcing sheet is a woven glass fibre structure. The reinforcing sheet is preferably secured on the extrudate outside the shaping tool during the discharge of the extrudate from an extruder or in a rest position after the discharge of the extrudate from an extruder. The extrudate preferably forms a hose or a sheet at the point in time when the reinforcing sheet is secured on the hot extrudate outside the shaping tool, i.e. is preferably extruded in the form of a hose or sheet.

Outside the shaping tool, the reinforcing sheet is preferably secured on the extrudate by means of an extendable ram.

The ram can hold the reinforcing sheet by means of a vacuum. The vacuum is preferably ended when the reinforcing sheet has been secured on the hot extrudate. The ram is then removed from the extrudate again, in particular retracted.

The ram is preferably pressed into the hot extrudate in a force- or travel-controlled manner in order to secure the reinforcing sheet on the hot extrudate outside the shaping tool.

The extrudate is preferably shaped to form the tank wall of the plastic tank by blow moulding in the shaping tool, wherein the reinforcing sheet is secured more strongly on the tank wall, in particular welded more strongly to the tank wall, by means of the pressure during the blow moulding and/or by means of a vacuum in the shaping tool.

Developments of the invention are specified in the dependent claims, the description and the appended drawings.

DRAWINGS

Embodiments will be illustrated by way of example in the drawings and explained in the description hereinbelow.

FIGS. 2A to 2F are schematic illustrations of a method for producing a plastic tank, in accordance with embodiments.

FIGS. 3A to 3D are schematic illustrations of the attachment of a reinforcing sheet in the method of FIGS. 2A to 2F.

DESCRIPTION

Figure 1:
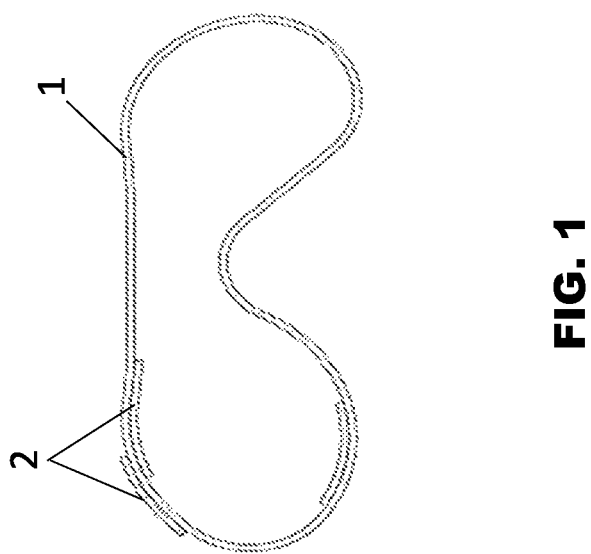
FIG. 1 is a schematic illustration of a plastic tank produced, in accordance with embodiments.

The local deformation of a tank shell is to be reduced by attaching structural components, i.e., reinforcing sheets 2, and particularly, fibre-reinforced structural components. For this purpose, the reinforcing sheets 2, structural components, or patches, can be attached inside and/or outside the tank.

FIG. 1 illustrates a plastic tank of this kind, in which a tank wall 1 of the plastic tank is partially reinforced by attaching reinforcing sheets 2 or patches in various regions. At least an outer layer of the tank wall 1 of the plastic tank is composed of HDPE. A reinforcing sheet 2, which is composed at least partially of the same material HDPE, is attached at a plurality of regions to the outer layer of the tank wall 1 of the plastic tank. The reinforcing sheets 2 are composed of a fibre-reinforced plastic, wherein the fibre reinforcement is embedded into a matrix and wherein the matrix is composed of the high-density polyethylene.

As illustrated in FIGS. 2A to 2F, to produce a plastic tank of this kind, the tank wall 1 is first of all prepared as a hot extrudate 1'. The extrudate 1' may additionally be in the form of a hose or a sheet. Outside of a shaping tool 3, to which the shape of the tank shell is to be subsequently formed, the reinforcing sheets 2 are secured on the hot extrudate 1', and particularly, melted on by contact (as illustrated in greater detail in FIG. 3).

It can be seen that the hot extrudate 1' is extruded by an extruder 4, and the reinforcing sheet 2 is secured on the extrudate 1' by contact outside the shaping tool 3 during the discharge of the extrudate 1' from the extruder 4. The extrudate 1' can flow into the tool 3 from the top down. The ram 5 for applying the reinforcing sheet 2 can be arranged between the die of the extruder 4 and the shaping tool 3.

Outside the shaping tool 3, the reinforcing sheet 2 is secured on the extrudate 1' by means of the extendable ram 5. The extrudate 1' with the secured reinforcing sheets 2 is then introduced into the shaping tool 3 and is shaped to form the tank wall 1 of the plastic tank in the shaping tool 3, whereby the reinforcing sheets 2 are secured more strongly on the tank wall 1, namely fused or welded more strongly to the tank wall 1.

The extrudate 1' is shaped to form the tank wall 1 of the plastic tank by blow moulding in the shaping tool 3, wherein the reinforcing sheet 2 is secured more strongly on the tank wall 1, in particular welded more strongly to the tank wall 1, by means of the pressure during the blow moulding and/or by means of a vacuum in the shaping tool 3.

The method described is thus based on the positioning and fusing of the matrix material HDPE of the fibre patches or reinforcing sheets 2 to the HDPE outer layer material of the tank shell outside the shaping tool 3.

The fusing described takes place in a two-stage process. In a first step, the patch 2 is positioned at a defined location on the extrudate 1' and is secured by bringing the semifinished product 1' and the fibre patch or reinforcing sheet 2 into contact. By means of the subsequent forming process, and particularly, blow moulding, permanent fusing of the two materials is brought about, and a permanent materially bonded connection is formed.

As illustrated in FIGS. 3A to 3D, the attachment of the reinforcing sheets 2 are provided. The extrudate 1' is moved into a defined position under the outlet die of an extruder 4 and adjacent to a ram 5. The fibre patch 2 is positioned on this ram 5 and is brought into contact with the hot sheet 1' by being applied thereto, and particularly, by extending the ram 5. This can be a patch or reinforcing sheet 2 that is heated or is at room temperature.

The fibre patch 2 is held in position on the ram 5 by being subjected to a vacuum. This vacuum is preferably implemented by means of an encircling groove or by the use of holes. During the application of the ram 5, the vacuum remains until positioning has been completed.

To apply the necessary contact pressure, the ram 5 is pressed into the partially plasticized extrudate 1' up to a certain end position in a force- or travel-controlled manner. For this purpose, the edge regions of the ram 5 can be provided with a chamfer. The contact pressure of the glass fibre patch 2 on the extrudate 1' can be additionally intensified by means of an encircling vacuum groove or encircling vacuum holes. During this process, the extrudate 1' is additionally sucked against the surface of the ram 5 by the vacuum groove or vacuum holes.

After a contact pressure time has expired, the vacuum for securing the patch 2 is deactivated, and the ram 5 moves back into the initial position without the fibre patch 2. The extrudate 1', which is now reinforced with the fibre patch or reinforcing sheet 2, is fed to the blow moulding process, in which a permanent materially bonded connection between the fibre patch 2 and the tank wall 1 that has now been formed is obtained through the application of excess pressure and/or a vacuum from the direction of the tool.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Tank wall
1' Extrudate
2 Reinforcing sheet
3 shaping tool
4 Extruder
5 Ram

What is claimed is:

1. A method for producing a plastic tank, the method comprising:
   preparing a tank wall as a hot extrudate, in which at least one outer layer of the hot extrudate is composed of a first material;
   attaching a reinforcing sheet, composed at least partially of the first material, to at least one region of the outer layer of the hot extrudate;
   introducing the attached reinforcing sheet and the hot extrudate into a shaping tool;
   shaping, via the shaping tool, the hot extrudate and the attached reinforcing sheet to form the tank wall, while simultaneously enhancing the attachment of the reinforcing sheet to the tank wall, wherein:
attaching the reinforcing sheet comprises attaching the reinforcing sheet outside of the shaping tool via an extendable ram by pressing the extendable ram into the hot extrudate in a force-controlled or travel-controlled manner.

2. The method of claim 1, wherein attaching the reinforcing sheet comprises welding the reinforcing sheet to the at least one region of the outer layer of the hot extrudate.

3. The method of claim 1, wherein the reinforcing sheet is composed of a fibre-reinforced plastic.

4. The method of claim 1, wherein the fibre reinforcement is embedded into a matrix composed of the first material.

5. The method of claim 1, wherein the first material comprises high-density polyethylene.

6. The method of claim 1, wherein the reinforcing sheet comprises a woven glass fibre structure.

7. The method of claim 1, wherein attaching the reinforcing sheet comprises attaching the reinforcing sheet during a discharge of the hot extrudate from an extruder.

8. The method of claim 1, wherein attaching the reinforcing sheet comprises attaching the reinforcing sheet in a rest position of the hot extrudate in an extruder during an extrusion process.

9. The method of claim 1, wherein attaching the reinforcing sheet comprises attaching the reinforcing sheet after discharge of the hot extrudate from an extruder.

10. The method of claim 1, wherein the hot extrudate forms a hose or a sheet at a point in time when the reinforcing sheet is attached to the at least one region of the outer layer.

11. The method of claim 1, wherein shaping the hot extrudate comprises blow moulding the hot extrudate in the shaping tool.

12. The method of claim 11, wherein enhancing the attachment of the reinforcing sheet to the tank wall comprises applying pressure in the shaping tool during the blow moulding.

13. The method of claim 11, wherein enhancing the attachment of the reinforcing sheet to the tank wall comprises applying a vacuum in the shaping tool during the blow moulding.

14. The method of claim 1, wherein, during the attachment of the reinforcing sheet, the extendable ram holds the reinforcing sheet via a vacuum, and releases the vacuum when the reinforcing sheet is attached to the hot extrudate.

15. A method for producing a plastic tank, the method comprising:
extruding, via an extruder, a hot extrudate having at least one outer layer composed of a first material;
attaching, during a discharge of the hot extrudate from the extruder, a reinforcing sheet composed at least partially of the first material to at least one region of the outer layer;
shaping, via a shaping tool, the hot extrudate and the attached reinforcing sheet to form the tank wall, while simultaneously enhancing the attachment of the reinforcing sheet to the tank wall by applying pressure in the shaping tool or by applying a vacuum in the shaping tool.

16. A method for producing a plastic tank, the method comprising:
extruding, via an extruder, a hot extrudate having at least one outer layer composed of a first material;
attaching, after discharge of the hot extrudate from the extruder, a reinforcing sheet composed at least partially of the first material to at least one region of the outer layer;
shaping, via a shaping tool, the hot extrudate and the attached reinforcing sheet to form the tank wall, while simultaneously enhancing the attachment of the reinforcing sheet to the tank wall by applying pressure in the shaping tool or by applying a vacuum in the shaping tool.

* * * * *